United States Patent [19]

Bielicki

[11] Patent Number: 4,587,788

[45] Date of Patent: May 13, 1986

[54] FASTENING DEVICE

[76] Inventor: Michael D. Bielicki, 26283 Olinda Trail, Lindstrom, Minn. 55045

[21] Appl. No.: 483,692

[22] Filed: Apr. 11, 1983

[51] Int. Cl.⁴ .................. E04B 1/00; E04H 17/141
[52] U.S. Cl. ........................................ 52/698; 52/285; 256/59; 403/353
[58] Field of Search ............... 52/698, 699, 700, 701, 52/295, 489, 285, 256, 713, 714; 403/353, 407, 52, 54, 56, 405, 256, 260, 262; 248/243; 256/59, 65

[56] References Cited

U.S. PATENT DOCUMENTS

| | | | |
|---|---|---|---|
| 594,749 | 11/1897 | Mitchell | 52/698 |
| 702,623 | 6/1902 | Brunner et al. | 5/299 |
| 714,885 | 12/1902 | Faught | 5/299 |
| 1,280,485 | 10/1918 | Kahn | 52/699 |
| 1,285,202 | 11/1918 | Jaques et al. | 52/699 |
| 1,630,293 | 5/1927 | Fish | 182/92 |
| 1,699,256 | 1/1929 | Swanson | 5/299 |
| 1,816,694 | 7/1931 | Pope | 248/239 |
| 1,872,813 | 8/1932 | Reiland | 52/699 |
| 2,005,895 | 6/1935 | Hengstenberg | 52/698 |
| 2,246,457 | 6/1941 | Schultz | 403/217 |
| 2,724,764 | 11/1955 | Ritchie | 312/351 |
| 3,265,344 | 8/1966 | Ornstein | 248/243 |
| 3,288,192 | 11/1966 | Bollinger | 411/166 |
| 3,513,606 | 5/1970 | Jones | 52/241 |
| 3,548,425 | 12/1970 | Goldstein | 5/299 |
| 3,733,054 | 5/1973 | Storch | 52/701 |
| 3,894,377 | 7/1975 | Welch | 52/713 |
| 3,996,718 | 12/1976 | Welch | 52/285 |
| 4,037,384 | 7/1977 | Molyneux | 52/698 |
| 4,038,801 | 8/1977 | Busch | 52/698 |
| 4,142,809 | 3/1979 | Shell | 403/201 |
| 4,295,638 | 10/1981 | Eldeen | 256/59 |
| 4,344,604 | 8/1982 | Basey | 256/65 |
| 4,367,864 | 1/1983 | Eldeen | 256/59 |

FOREIGN PATENT DOCUMENTS 1168047  4/1964  Fed. Rep. of Germany ........ 52/698

Primary Examiner—John E. Murtagh
Assistant Examiner—Andrew Joseph Rudy
Attorney, Agent, or Firm—Anthony G. Eggink

[57] ABSTRACT

The fastening device is for securely joining opposing surfaces of two structural members. The fastening device provides for a flush joining of opposing surfaces of two structural members to maximize strength and appearance characteristics. The fastening device is comprised of an elongated, rigid member having a head portion at one end, and means to adjustably secure it to a structural member at its opposite end. A rigid plate member, for securement in a position aligned with a recessed or apertured portion of a second structural member, is provided to communicate with the elongated, rigid member. The rigid plate member has an aperture of a predetermined configuration consisting of an enlarged apertured portion and an elongated apertured portion having a lesser width, which communicates with the enlarged apertured portion. The rigid plate member has a thickness which varies in an inclined, sloping manner, increasingly from the widest portion of its aperture and directionally along the elongated portion of the aperture. With the elongated, rigid member secured to a structural member, and the plate member secured in a recessed position to a second structural member, the head portion of the elongated rigid member is extended, and slid through, the aperture of the plate member, to provide for the secure, flush joining of the opposing surfaces of the two structural members.

9 Claims, 5 Drawing Figures

FASTENING DEVICE

This invention relates to a fastening device for securely joining structural members. Particularly, this invention relates to a fastening device for securely and removably joining, in a flush arrangement, the two opposing surfaces of two structural members.

The fastening device according to the invention is useful for building construction purposes. The fastening device permits the secure and removable joining of two structural members, and the device results in a joined structural member arrangement which is quick to assemble and which maximizes both the strength characteristics and the visual aspects of the resulting joint. And, the fastening device of the invention is particularly useful to provide a flush and strong joining arrangement for such perpendicularly disposed members as newel posts, which are subsequently utilized to support handrails in the construction of staircases, removable wall studs to building foundations, and posts to concrete or other foundations, in the construction of deck railings, for example.

In the past, several types of generally unrelated fastening devices have been proposed or utilized. However, these fastening devices have, by design, been inherently limited in use for specific and unrelated applications. For example, one prior art device discloses an externally mountable base plate member for use in combination with a detachable step member, to provide a ladder system for telephone pole climbers. This device requires a constantly removable step for climbing purposes which is contrary to the securement requirement of the fastening device of this invention.

Other prior art devices teach the use of apertured slot arrangements to receive elongated members for purposes of providing shelf supports in ovens and refrigerators. However, these devices are generally designed to removably hold a downward force only, and, thus, fail to provide the secure joining of opposing members as does the fastening device of this invention. And, despite the longstanding need for an efficient and effective fastening device which provides for the secure joining, in a flush arrangement, of opposing surfaces of two structural members, none, in so far as is known, has been developed.

The fastening device according to this invention overcome the limitations and shortcomings of the prior art devices discussed above. Particularly, the fastening device of the invention provides for a means to permit a building contractor to removably and adjustably secure in a flush configuration the opposing surfaces of two structural members.

In summary, this invention provides a fastening device for securely joining opposing surfaces of two structural members. The fastening device provides a flush surface configuration for the structural members to maximize the strength and visual appearance characteristics of the joined members.

The fastening device is comprised of an elongated, rigid member having a head portion disposed at one end, and a means for securing the elongated member to a structural member at its opposite end. A rigid plate member is provided for securement in a position aligned with a recessed or apertured portion of a second structural member. The rigid plate member has an internally disposed aperture of a predetermined configuration extending therethrough. The plate aperture has an enlarged apertured portion to receive the head portion of the elongated rigid member, and an elongated aperture in communication with the enlarged apertured portion, of a lesser width, to slidably receive the shaft portion of the elongated rigid member. The rigid plate member additionally has a thickness which varies in a predetermined manner so that the plate thickness increases from the enlarged apertured portion along the elongated apertured portion, in an inclined, sloping manner.

Thus, subsequent to securing the elongated, rigid member to a structural member, an exposed shaft distance is defined between the bottom surface of the stuctural member and the head portion of the elongated, rigid member. The head portion is next extended through the widest or enlarged portion of the plate member aperture so that the sliding of the exposed shaft along the elongated apertured portion of the plate member causes the head portion of the elongated, rigid member to slide along the inclined bottom surface of the plate member. This action produces the fixed securement of the structural member to the plate member, and, consequently, to the second structural member to which the plate member is secured.

Additionally provided by the invention is an adjustable elongated, rigid member which permits a user to control the ultimate placement of the first structural member to the second structural member. And, provided by the invention are plate members which are smaller in dimension than the bottom surface of the first structural member so that a flush joining of the opposing surfaces of the respective structural members are realized without exposing the fastening device elements of the invention. The latter arrangement being particularly suited to secure and join newel posts to foundation portions in the construction of staircases, as well as in the securement and placement of vertical posts to deck foundations.

And, provided, are fastening devices which are inexpensive to manufacture, which utilize readily available bolts, and which are easily installable.

These and other benefits of this invention will become clear from the following description, by reference to the drawings, wherein.

Figure 1:
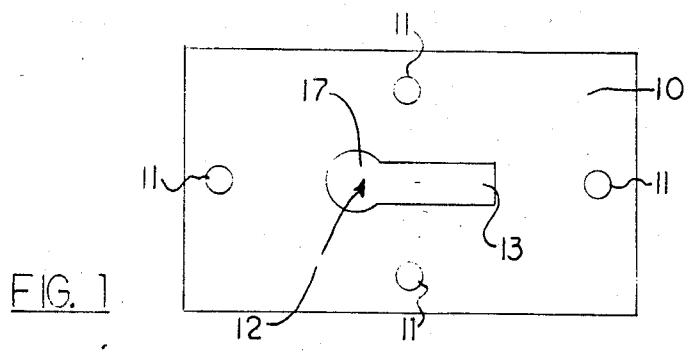
FIG. 1 is a top, schematic view of the fastening device plate member according to the teachings of this invention.
Figure 2:
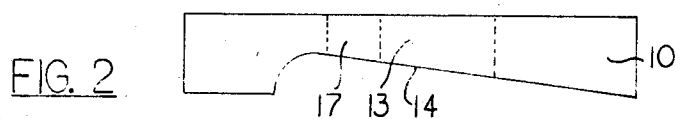
FIG. 2 is a lateral, schematic view of the plate member of the fastening device according to the teachings of this invention, as shown in FIG. 1.
Figure 3:
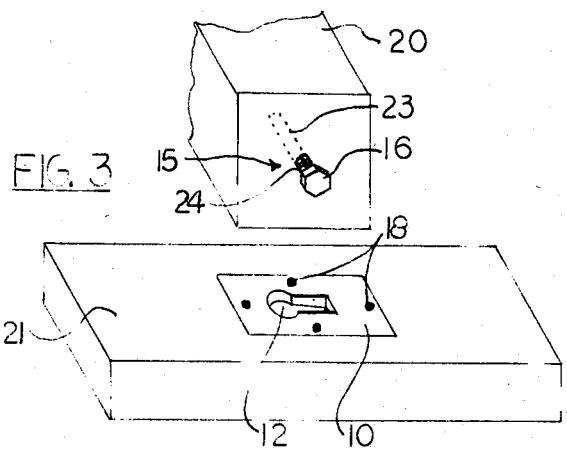
FIG. 3 is a perspective, schematic view of the fastening device of this invention, and, which shows the fastening device elements secured for use with two structural members.

Referring to FIGS. 1, 2 and 3, a fastening device of this invention is shown as having a rigid plate member 10 and an elongated rigid member 15. The plate member 10 has an apertured portion 12 therethrough, which extends from its flat upper surface to its bottom surface. The apertured portion 12 is of a configuration which is comprised of an enlarged, circular apertured portion 17 and an elongated, apertured portion 13 which extends from and communicates with the larger, circular, apertured portion 17.

Figure 4:
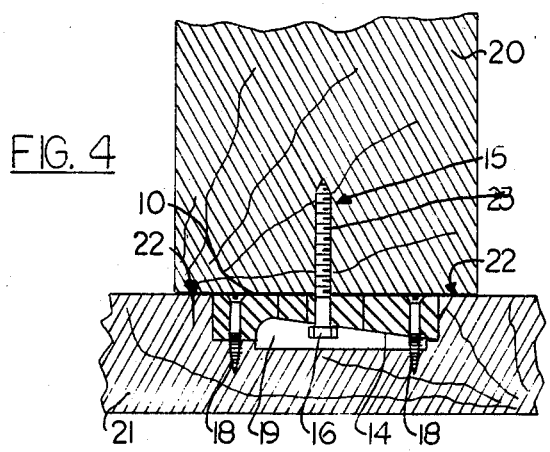
FIG. 4 is a lateral, sectional view of the fastening device of this invention, and, which shows the fastening device in use with two opposing structural members to provide a flush joining of the opposing surfaces of the structural members; and, FIG. 5 is a lateral, sectional view of the fastening device, and, which shows the device in use to mount a post to a concrete surface.

Importantly, as shown in FIG. 2, the rigid plate member 10 has a thickness which is generally equal at opposing ends, and which has an inclined or sloping bottom surface 14 between the opposing ends. The inclined surface 14 is such, so that the plate member thickness is smallest at aperture portion 17 and increases as the surface 14 slopes downward along the elongated aperture portion 13. Additionally, the plate member 10 has fastening means, such as apertures 11 to receive screws 18 as shown in FIG. 4, to mount plate member 10 to a structural member 21, such as a wooden foundation member or other flat surfaced member. The plate member 10 is of a rigid construction, such as steel, metallic alloy, or plastic.

Optionally, the inclined surface 14 is of a slotted nature, wherein the the inclined surface 14 does not extend completely from side to side. The width of the slot would, of course extend beyond the width of the aperture 12, and would be wide enough to permit the head 16 of a bolt 15 to slide therethrough. Additionally, the apertures 11 are preferably countersunk so that fastening screws 18 are flush with the top of the plate member 10.

An elongated, rigid member 15 having a shaft portion 23 and a head portion 16 is provided to function in conjunction with the plate member 10. The elongated member 15 is illustrated in FIG. 3 as being secured into a structural member 20, such as into the bottom of an upright newel post used in the construction of staircases. The elongated member 15 preferably has an adjustable shank or shaft portion 23, whereby the elongated, rigid member 15 can be secured into a structural member 20, so that the exposed shaft portion 24 can be set at a predetermined length. For wooded structural members, the elongated member 15 can be comprised of a bolt having a head and a threaded shaft. As shown in FIG. 3, the rigid, elongated member 15 is secured into the structural member 20, whereby the head portion 16 extends outwardly therefrom to provide the exposed shaft portion 24.

Figure 5:
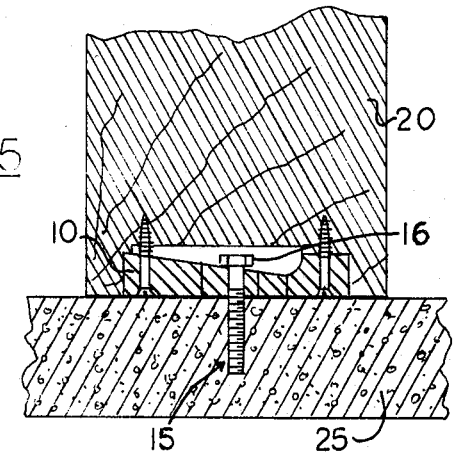

FIGS. 3, 4 and 5 illustrate the fastening device of this invention in use. FIG. 3, shows the rigid plate member 10 secured in a generally flush configuration to a structural member 21 by securing means 18. Thereabove, the elongated, rigid member 15 is illustrated adjustably secured into the generally flat bottom of a second structural member 20. The exposed head portion 16 is for insertion into the enlarged, apertured portion 17 of the plate member aperture 12.

FIG. 4 shows structural member 21, such as a horizontal foundation portion of a staircase, as having a recessed portion 19 therein. The plate member 10 is fixedly secured in the recessed portion 19 by fastening means such as screws 18. The recessed portion 19 is preferably of such dimensions so that the plate member 10 is flush or slightly below the surface of structural member 21. Additionally, the elongated rigid member 15 is shown as being secured into the bottom portion of structural member 20.

Initially, the head portion 16 of the elongated member 15 is inserted through the enlarged aperture portion 17 of the aperture configuration 12, so that the head portion 16 extends below the bottom surface 14 of plate member 10. Next, the structural member 20 is slidably forced in a horizontal direction to cause the head portion 16 to slide beneath and along the inclined surface 14 of the plate member 10. It is important, that dimensionally, with respect to that of the head portion 16, that the apertured portion 17 of aperture 12 be larger than the head portion 16, and that the elongated apertured portion 13 be smaller than that of the head portion. Thus, as the structural member 20 is moved with respect to structural member 21, the head portion 16 eventually comes in squeezing communication with the inclined bottom surface 14 of plate member 10.

As shown in FIG. 4, the opposing surfaces of structural members 20 and 21 are joined in a flush arrangement as indicated at 22. it is important to note that the adjustable nature of the shaft portion 23 of elongated member 15 permits the exposed shaft portion 24 to be controllable in length. And, the length of the exposed shaft portion 24 determines at which point the head portion 16 comes in contact with the inclined, sloped bottom surface 14 of plate member 10. This will determine at which position the structural member 20 becomes secured with respect to the structural member 21. The user is able to control the final secured position of the two structural members, therefore, by setting the exposed shaft distance 24 at a predetermined length.

The structural member 20 and 21 configuration shown in the drawings is primarily for horizontally and vertically disposed members. And, this is particularly applicable to the newel post joining in a flush configuration to horizontal stair surfaces to build staircases. The flush surface arrangement 22 provide post settings which maximize the structural strength, as well as the visual appearance of the opposing structural members. Thus, the fastening means provided by the fastening device of this invention permits a contractor to construct or set newel posts on surfaces in an adjustably fixed manner without the showing of the fastening means itself. In the past, for example, nails or screws were utilized at the bottom of posts for securement. The nails or screws were either visable, or had to be set into the surface and subsequently covered.

FIG. 5 illustrates the fastening devices of the invention in use to secure an upright structural member 20, for example, to a structural concrete surface 25. This arrangement is particularly applicable in the construction of decks, porches, etc., where concrete foundations are encountered. In this case, it is easier to initially set the elongated, rigid member 15, or bolt within the concrete, when poured, and then to secure the rigid plate member 10, in a flush arrangement, into the bottom of a wooden post 20, for example. Optionally, and not shown, a wooden member or sleeve member having an interiorly threaded surface to receive a threaded bolt, can initially be placed in the concrete so that a bolt 15 can subsequently be adjustably secured therein.

Although the fastening device of the invention has been described and illustrated in use with perpendicularly disposed structural members, it is within the purview of the invention to utilize the devices in other structural settings. For example, the devices are usable to join structural members, such as studs, for walls that are designed to be movable or readily removable. The fastening device of this invention permits a contractor to strike a structural member 20, for example, in a direction opposite its installation, to loosen the bolt head 16 from the inclined bottom portion 14 of plate member 10. Thus, the utilization of the fastening devices are suitable for setting upright structural wall members in large building complexes which periodically require the moving of walls to suite a particular purpose, tenant or owner.

Additionally, it is within the purview of the invention to utilize the fastening devices in structural settings other than upright to horizontal structural member joining. For example, the devices can be utilized in a vertical or appendingly downward manner, and the structural members can be askew or slanted with respect to each other. This arrangement is useful in joining the end of a railing section to a wall or newell post in the construction of staircases.

Additionally, although the plate members 10 of the fastening devices are shown as being generally rectangular in configuration, they can obviously be of any configuration so long as the member has an aperture configuration as described above, and that the bottom surface is of an inclined and sloping configuration with respect to the aperture as discussed above.

As many changes are possible to the embodiments of this invention, utilizing the teachings thereof, the description above, and the accompanying drawings, should be interpreted in the illustrative, and not in the limited sense.

That which is claimed is:

1. A concealable fastening device for rigidly and adjustably securing in a flush arrangement the end portion of a first structural member having a flat end surface to the surface of a second structural member also having a flat surface portion and further having a recessed portion with a predetermined peripheral depth therein, said concealable fastening device having a configuration to minimize the moment of force between the first and second structural members, said device comprising:
    (a) an elongated, unitary, rigid member having opposing end portions, one end portion for securement into the end surface of a first structural member, and the opposite end portion being a widened head having a generally flat, non-movable bottom surface, said elongated rigid member further having a shaft portion with a generally uniform cross-section extending downward from said widened head end portion,
    (b) means for adjustably securing the opposite end of said elongated, rigid member into the end portion surface of the first structural member so as to be rigid therewith, said means to permit length adjustability of the uniform shaft portion to control the spacing of the widened head portion relative to the end portion surface of the first structural member,
    (c) a solid and rigid plate member consisting essentially of a rigid and unyielding body member of a steel construction for insertion and securement in the recessed portion of the second structural member, said plate member having a flat and generally continuous upper surface for contact with the end surface of the first structural member and being dimensionally smaller than the end surface of the first structural member end surface for concealing the device when in use, said plate member further having a predetermined uniform thickness at at least its opposing ends so that the plate member, when placed on the peripheral portion in the recessed portion of the second structural member, can be drawn in a flush configuration with the end surface of the first structural member to minimize the moment of force between the members, said plate member further having one elongated, slotted, and inclined bottom surface apertured portion having a uniform slope extending therethrough for slidably receiving said head portion and uniform shaft portion of said elongated, rigid member, and,
    (d) means for securing said plate member within the recessed portion of a second structural member so that the upper surface of said plate member is generally flush with the surface of a second structural member, whereby, subsequent to adjustably securing said elongated, rigid member to a first structural member, and securing said plate member within a recessed portion of a second structural member, a user is able to insert the nonmovable head portion of said unitary, rigid member into the elongated, slotted portion of said plate member, to secure in a flush arrangement two structural members by slidably forcing said head portion along the inclined bottom surface aperture of said solid plate member to secure the end portion surface of the first structural member to the upper surface of said solid plate member, to thereby, conceal said fastening device between said first and second structural members and to rigidly secure said structural members in a flush configuration to minimize the moment of force between them.

2. The fastening device of claim 1, wherein said elongated, rigid member is a threaded bolt having a head portion at one end thereof.

3. The fastening device of claim 1, wherein said plate member is constructed of metal, and, wherein said elongated, slotted and inclined bottom surface aperture is of a keyhole configuration.

4. The fastening device of claim 1, wherein said means for securing said plate member is comprised of a plurality of peripherally disposed apertures for receiving fastening means.

5. The fastening device of claim 4, wherein said fastening means are comprised of screws for insertion through said peripheral apertures.

6. A concealable newel post fastening device for rigidly securing in a flush arrangement a vertical newel post having a bottom end surface to a horizontal surface of a structural element having a flat horizontal surface and a recessed cavity with a predetermined peripheral depth therein, said concealable fastening device having a configuration to minimize the moment of force of the newel post about the horizontal surface of the structural element, said device comprising:
    (a) an elongated, unitary, rigid, threaded bolt member having a head portion at one end thereof, said threated bolt member for the adjustable securement into the bottom portion of a vertical newel post and essentially having a generally uniform cross-sectional shaft portion extending from its head portion, and,
    (b) a solid, rigid, incompressible and rectalinear plate member for insertion and securement into the recessed cavity of a horizontal surface, said plate member having an upper surface, a lower surface and predetermined opposing peripheral thickness portions not greater than the peripheral depth of the recessed cavity, said upper surface essentially being flat and dimensionally smaller than the bottom surface portion of the newel post for concealing the device when in use, said plate member further having a single keyhole aperture through its solid structure for receiving the head portion of said threaded bolt member, said keyhole aperture further having an inclined bottom surface of a uniform slope which extends downward from generally its circular aperture to the end of its elongated slotted portion, said plate member further having means for securing said plate member within the recessed cavity of a horizontal surface, said securing means comprising a plurality of apertures disposed about said keyhole aperture in said plate member and wherein said plate member has opposing side edges of generally equal thickness to maintain said plate member in a generally flush configuration with a horizontal surface when placed in a recessed cavity thereof, whereby, subsequent to securing said threaded bolt member to the bottom portion of a vertical newel post and the securement of said plate member within the recessed cavity of a horizontal surface, the head portion and the uniform cross-sectional shaft portion of the bolt member can be inserted through the circular aperture of the keyhole aperture and forcibly slid along the elongated slotted portion thereof to secure the vertical newel post to a horizontal surface in a flush arrangement by securing the bottom portion of the vertical post to the upper surface of said solid plate member to thereby, conceal said fastening device between the newel post and the horizontal structural surface and to rigidly secure the newel post in a configuration that minimizes the moment of force of the post about the plate member.

7. The fastening device of claim 6, wherein said threaded bolt member and said rigid plate member are constructed of a metallic material.

8. A fastening device for securely joining two structural members in a flush arrangement, said device comprising a solid, incompressible and rigid plate member for securement in a recessed portion of a first structural member and for contact with a surface of the second structural member, said plate member being of a generally rectangular slab configuration of a generally uniform thickness and having a single keyhole aperture extending therethrough and further having a slanted bottom portion defined by a generally triangular prism portion removed from the bottom portion of the rectangular slab configuration and being axially disposed along said keyhole aperture to form two parallel sliding surfaces, one sliding surface being disposed on each side of said aperture, the slanted bottom portion having a uniform slope and increasing in thickness from generally the top to the bottom of said keyhole aperture, said plate member also having means to secure it to a first structural member, said means to secure being comprised of at least one peripheral aperture outside said sliding surfaces and screw means for insertion therethrough, said peripheral aperture further being countersunk to receive the head of said screw means to provide for the flush contact of the upper portion of said plate member to the surface of the second structural member, said device further having a bolt member for the adjustable securement into a second structural member, said bolt member having a unitary head portion for insertion into said keyhole aperture of said rigid plate member and to engage said parallel sliding surfaces, said head portion being smaller in width than the top portion of said keyhole aperture and being larger in width than the elongated bottom portion of said keyhole aperture, whereby, subsequent to adjustably securing said bolt member into the first structural member and securing the plate member in a flush configuration in the recessed portion of the second structural member, the head portion of said bolt member is inserted through the top of said keyhole aperture of the plate member and is forceably moved along the opposing parallel sliding surfaces to secure the two structural members in a flush arrangement due to the opposing forces exerted by the second structural member to the top of said solid plate member and by the bolt head on the parallel sliding surfaces on the bottom of said solid plate member.

9. The fastening device of claim 8, wherein said solid and rigid plate member is constructed of an incompressible material selected from the group of materials consisting of metallic and plastic materials.

* * * * *